March 2, 1971   C. F. MARTIN   3,566,505
APPARATUS FOR ALIGNING TWO SECTIONS OF PIPE
Filed June 9, 1969   4 Sheets-Sheet 3
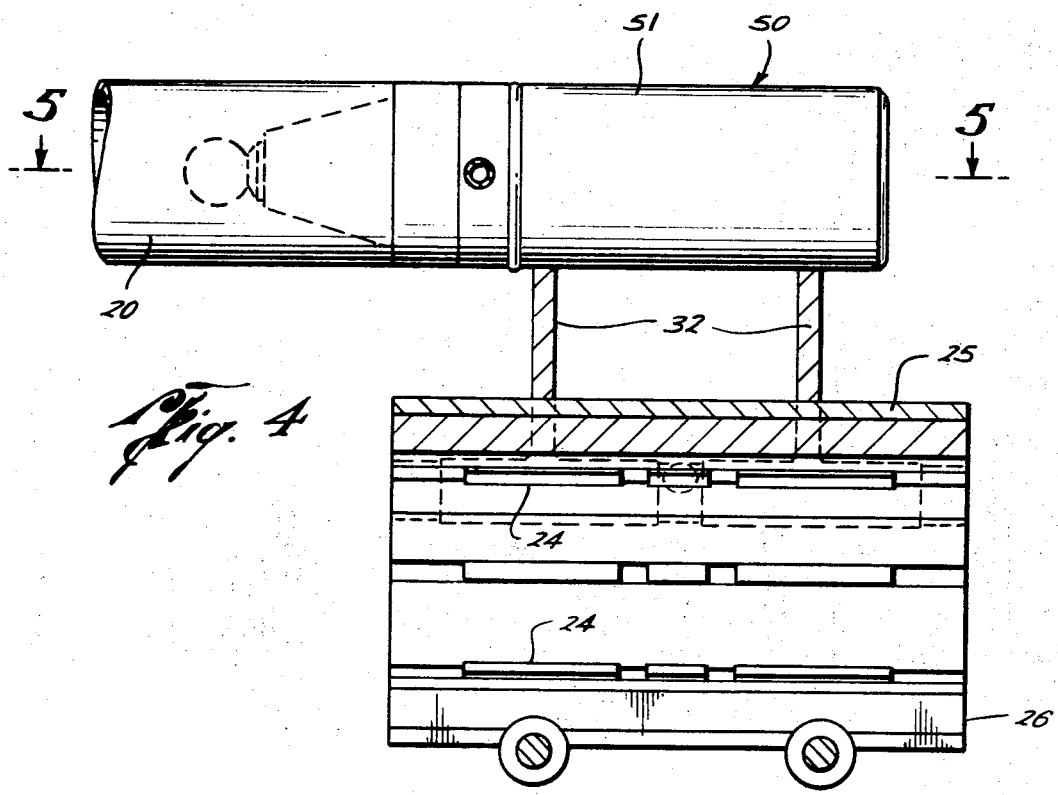
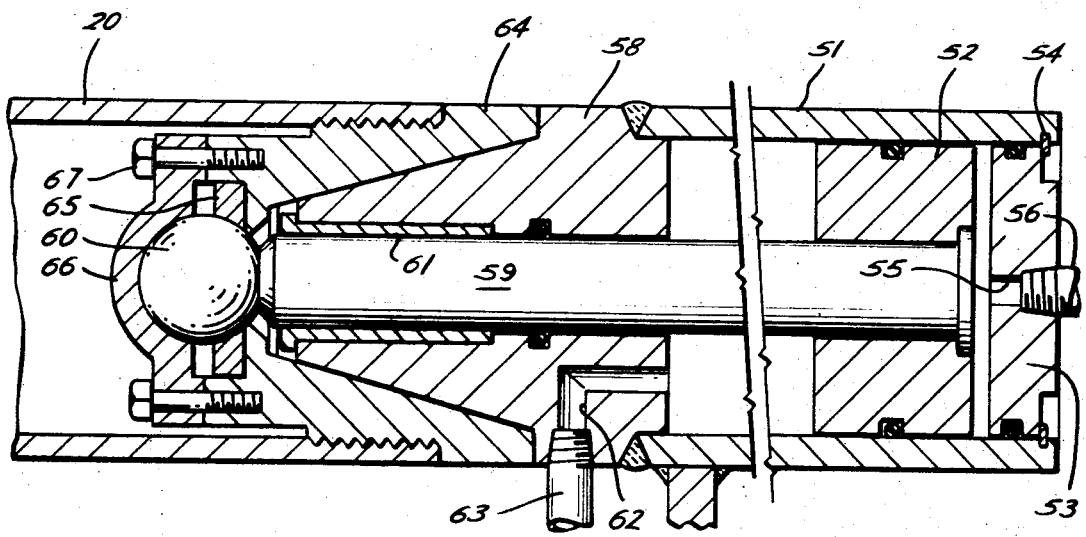
INVENTOR.
Charles F. Martin
BY
Lee R. Larkin
ATTORNEY March 2, 1971 C. F. MARTIN 3,566,505
APPARATUS FOR ALIGNING TWO SECTIONS OF PIPE
Filed June 9, 1969 4 Sheets-Sheet 4
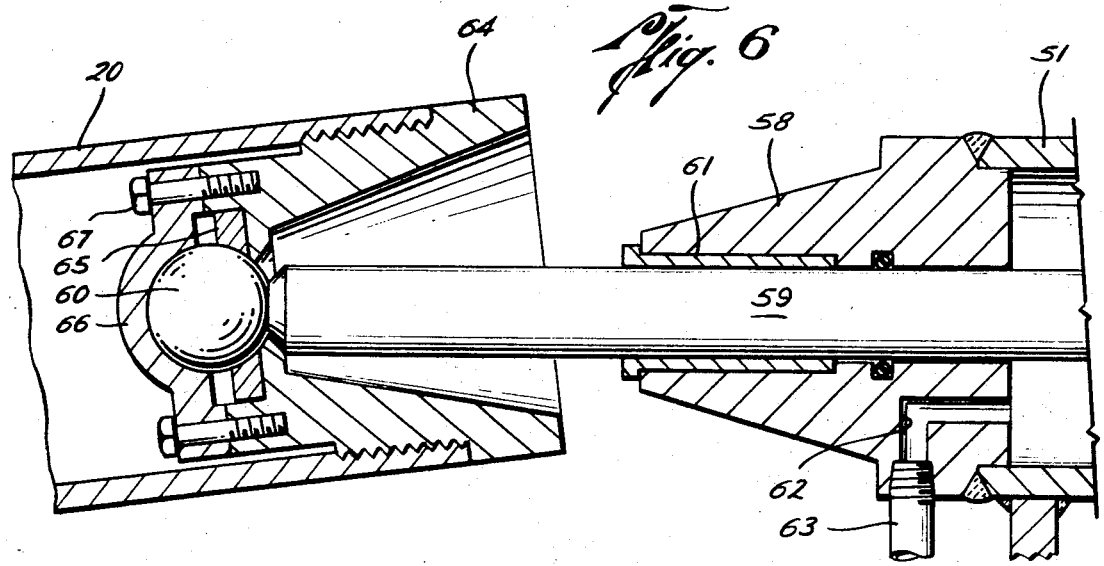
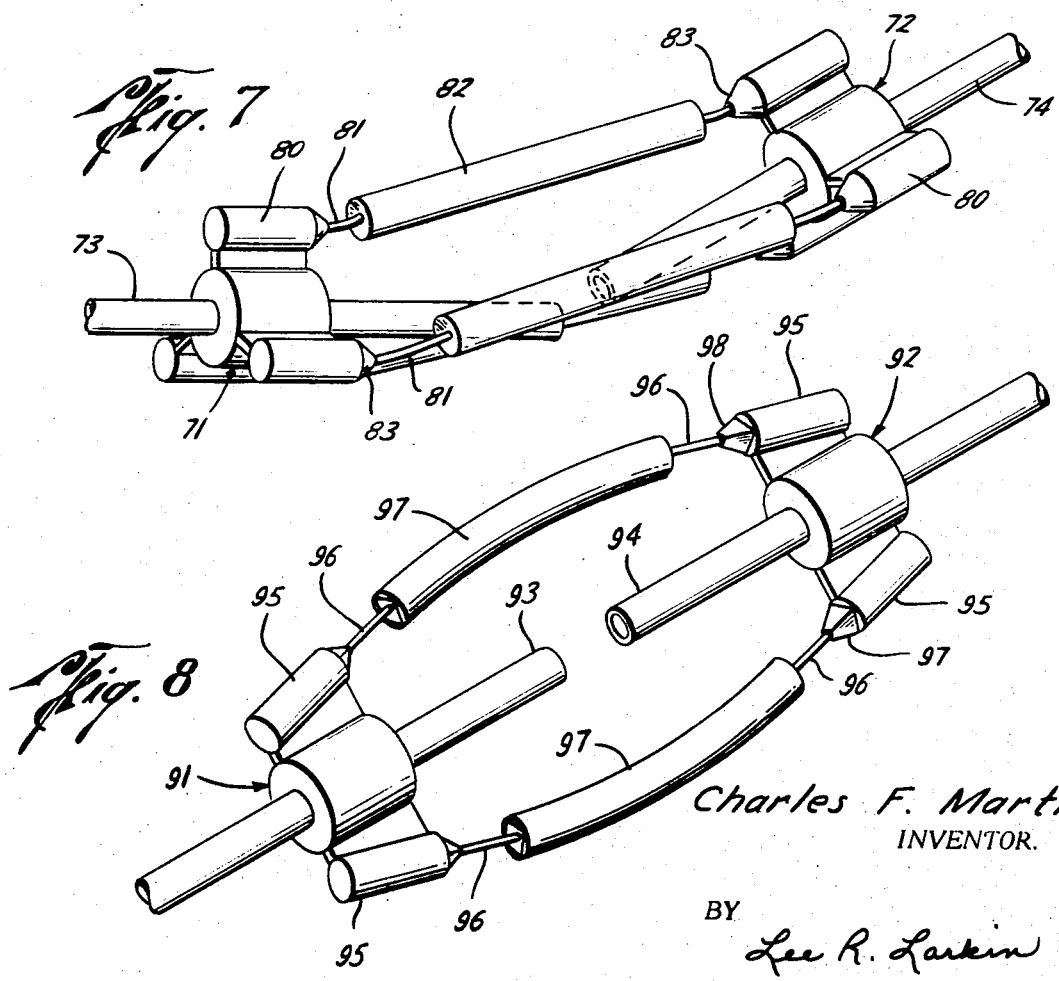
Charles F. Martin
INVENTOR.
BY
Lee R. Larkin
ATTORNEY United States Patent Office 3,566,505
Patented Mar. 2, 1971

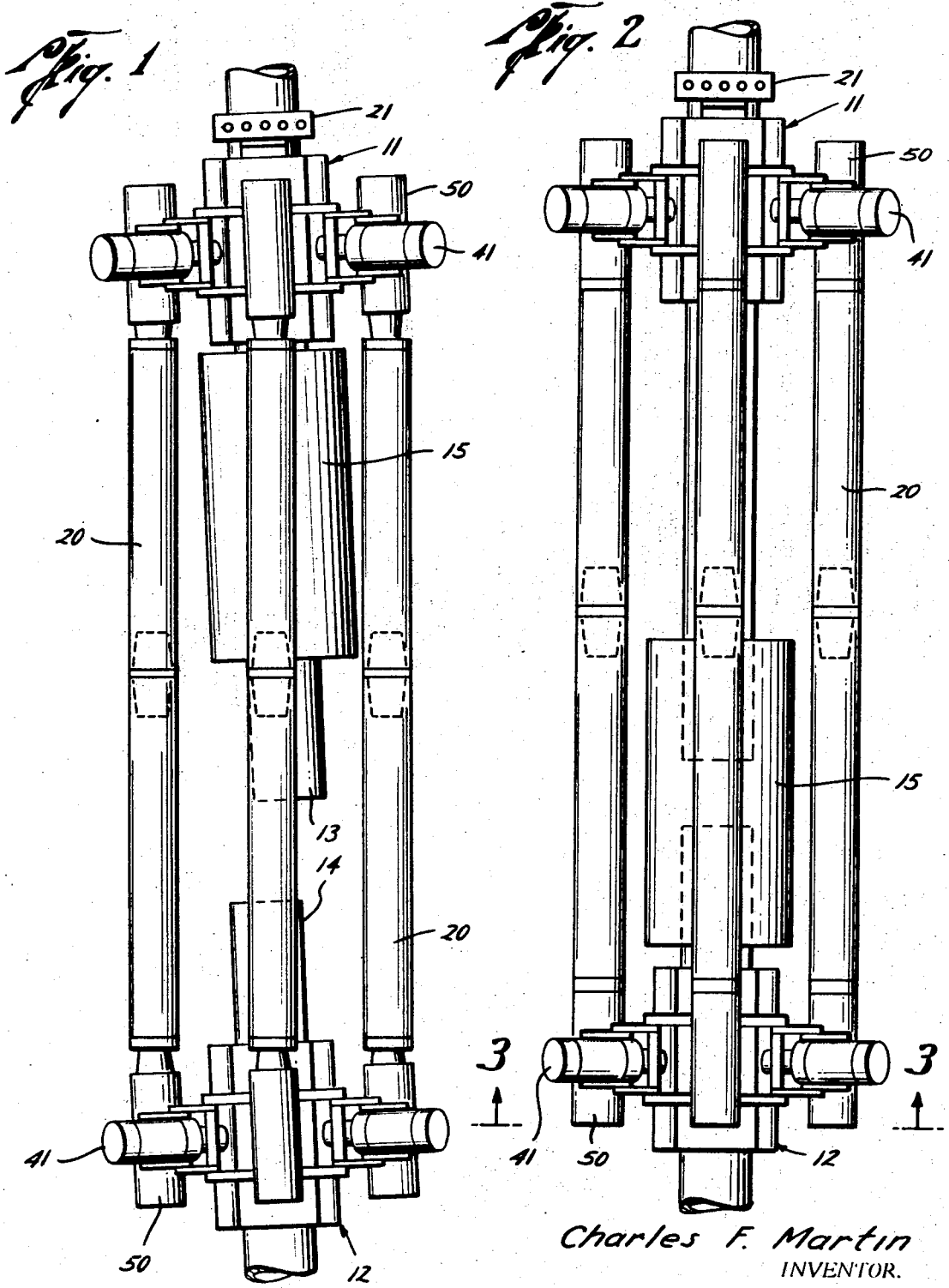

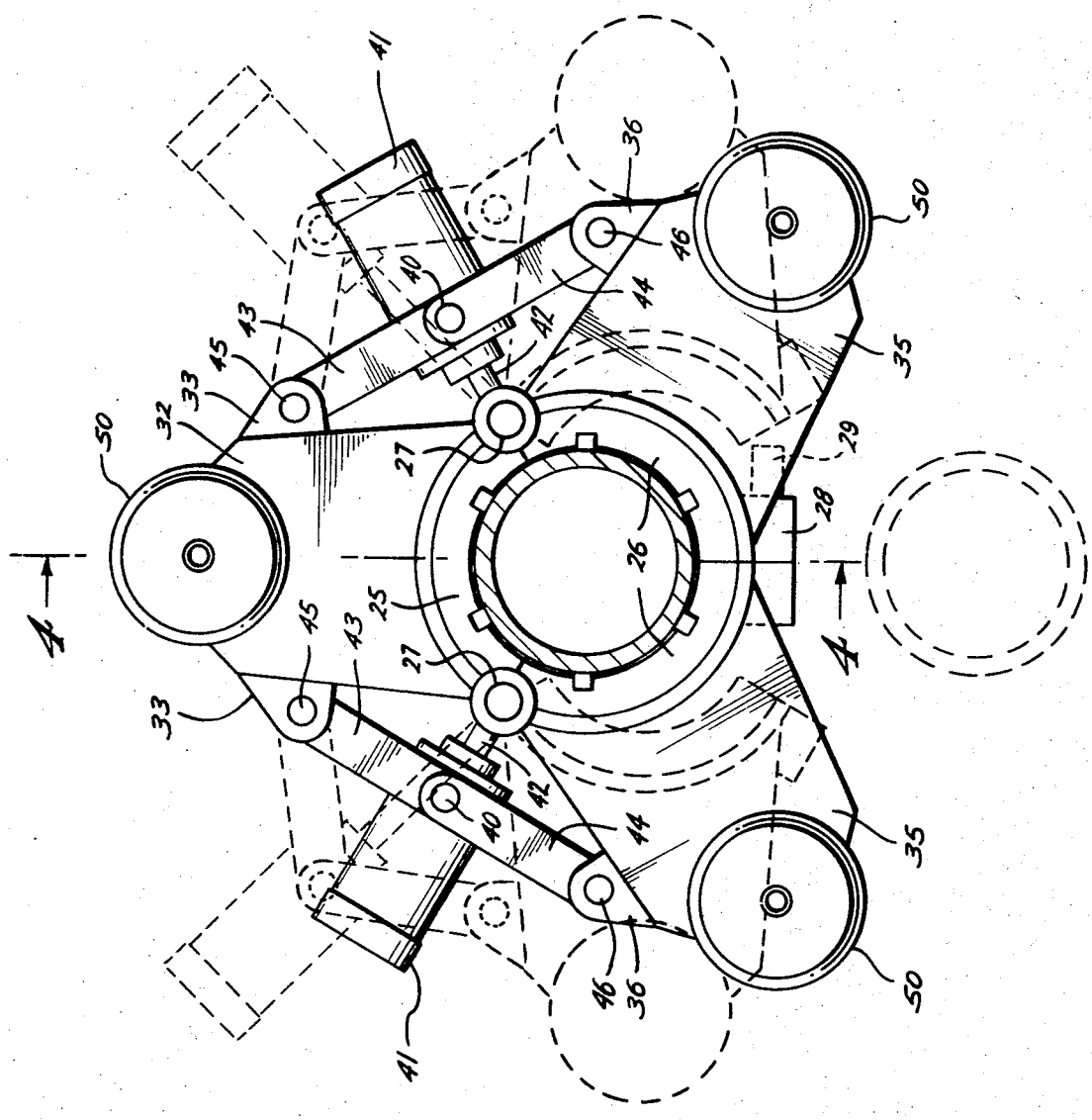

3,566,505
APPARATUS FOR ALIGNING TWO
SECTIONS OF PIPE
Charles F. Martin, Houston, Tex., assignor to
HydroTech Services, Inc., Houston, Tex.
Filed June 9, 1969, Ser. No. 831,576
Int. Cl. B23p 19/00
U.S. Cl. 29—200                               17 Claims

ABSTRACT OF THE DISCLOSURE

An apparatus for axially aligning two sections of pipe, as for example two sections of a severed pipeline located at a remote location, such as under water. It includes a pair of axially spaced apart clamps, each of which is arranged for clamping about a length of one of the sections of pipe. It includes a plurality of connecting members connected between the clamps. Abutment means are interposed between the ends of the connecting members and the clamps for holding the clamps and members in predetermined relationships wherein the clamps are axially aligned. It also includes means for moving the connecting members to said relationships whereby the sections of pipe are thereby axially aligned. The apparatus may also be used to hold two sections of pipe during the joinder thereof as by welding.

FIELD OF THE INVENTION

This invention relates to an invention for axially aligning two sections of pipe. More particularly, this invention relates to an apparatus for aligning two sections of pipe, such as two sections of a severed pipeline which could be under water or at some other remote location, whereby the sections of pipe can thereafter be joined, as by welding, couplings, or the like.

DESCRIPTION OF THE PRIOR ART

There has heretofore been a great need for a simple apparatus which could be used to axially align two sections of pipe so that the sections could thereafter be joined. The need is particularly acute for apparatuses which are designed to align sections of pipe which are initially substantially misaligned. In addition, there is a need for an apparatus which can align sections of pipe, such as a severed pipeline, in such a manner that the sections can be adjoined by means of welding or by means of a coupling, such as that taught in U.S. Pat. No. 3,393,926, or other coupling means. Coupling means of the type shown in the said patent are particularly useful in under water operations for joining sections of a submerged pipeline which has been severed. However, other means for joining the pipe sections can be utilized in connection with the invention taught herein.

In order to join such sections of pipe, it is desirable to have an apparatus which is simple in operation, and which can accommodate substantial misalignment of the pipe.

It is also desirable to have an apparatus which can accommodate misalignment of two sections of pipe at any angle and to thereafter move the sections of pipe to axial alignment and to hold them there until the coupling is affected, either by a hydraulic coupling or by other means such as welding or the like. U.S. Pat. No. 3,284,883 shows one type of pipe clamp over which the present invention might be considered an improvement.

SUMMARY OF THE INVENTION

Accordingly, it is an object of this invention to provide an improved apparatus for axially aligning two sections of pipe, which is simple of operation, which is arranged to accommodate substantial initial misalignment of pipe sections, which is suitable for use with hydraulic couplings or other coupling means, and which can be operated in adverse environmental conditions, such as at submerged locations.

Briefly stated, the invention includes a pair of axially spaced apart clamps, each of which is arranged for clamping about one of the sections of pipe. It also includes a plurality of connecting members connected between the clamps. It also includes abutment means between the clamps and the connecting members for holding them in predetermined and fixed relationships when abutting, and in which position the clamps are axially aligned. The invention also includes means for moving the connecting members into said predetermined position wherein the central axis of the clamp and hence the pipe sections are thereby axially aligned. In the preferred embodiment, the abutting ends of the connecting members and the adjacent portion of the clamps are arranged for abutting in a fixed relationship, such that the axial alignment of the sections of pipe is completed when the connecting members and the clamps are moved to this abutting relationship. These movement means may conveniently be in the form of hydraulic cylinder assemblies, or the like.

Certain embodiments of the invention may have articulated means for moving and holding the clamps and members in said relationships. The term "articulated" is used for example to denote a flexible or pivoted connection such as a cable or a universal connection, such as a ball and socket joint.

BRIEF DESCRIPTION OF THE DRAWINGS

Reference to the drawings will further explain the invention, wherein:

FIG. 1 is a top plan view of one presently preferred embodiment of the invention shown initially mounted on two misaligned sections of pipe and with the hydraulic coupling which may be used to join the two sections in place on one of the sections.

FIG. 2 is a view similar to FIG. 1, but showing the apparatus after having completed the alignment of the pipe sections and with the hydraulic coupling moved to the coupling position.

FIG. 3 is a generally enlarged view taken generally along line 3—3 of FIG. 2, with the dotted lines showing one of the clamps in the open position and solid lines showing the clamp in the closed position around a section of pipe.

FIG. 4 is a cross-section view taken generally along line 4—4 of FIG. 3.

FIG. 5 is an enlarged and fragmentary view taken generally along line 5—5 of FIG. 4.

FIG. 6 is a view similar to FIG. 5, but showing the connection in the fully articulated condition as it might initially appear before reaching the position shown in FIG. 1.

FIG. 7 is a schematic isometric view of an alternate embodiment of the invention using flexible cables as the articulated connecting means.

FIG. 8 is a schematic isometric view of still another alternative embodiment of the invention having only two connecting members and with mating pyramid shaped surfaces forming the abutment means and with either cable or rod connecting members.

DESCRIPTION OF THE PREFERRED EMBODIMENTS

Referring now to FIG. 1 a pair of pipe clamps 11 and 12 are generally shown mounted about sections of pipe 13 and 14 respectively, which pipes, as will be observed, are substantially misaligned. This misalignment will have been sufficient for hydraulic coupling 15 to be mounted upon pipe section 13 as shown, if such coupling is to be used to couple the sections of pipe. It is to be understood that hydraulic coupling 15 is of the type shown in U.S. Patent No. 3,393,926, for example, but it is to be understood that this invention is not limited to such couplings and is intended for use of other coupling means including welding.

Pipe clamps 11 and 12 are joined by a plurality of circumferentially spaced apart connecting members in the form of bars or cylindrical beams 20, with each end of each of the beams 20 being connected to a portion of one of the pipe clamps by an articulated connection means which will be described hereinafter. It is to be understood that pipe clamps 11 and 12 are substantial duplicates of each other, but arranged to operate in opposite directions. Pipe clamp 11 is shown in FIGS. 1 and 2 as having operating valve 21 attached thereto for operating the hydraulic components which are to be described hereinafter, but hydraulic lines have not been shown in order to maintain clarity of the description and the drawings.

Referring now to FIG. 3, each of the pipe clamps 11 and 12 includes an arcuate shaped central segment 25 which pivotally supports two hinged segments 26—26 by means of pivot pins 27—27. The bottom ends of hinged segments 26—26, as shown in FIG. 3, are provided with a pair of matching tension lugs 28—28 which are arranged to receive a threaded cap screw 29 thereinto to secure the segments 25 and 26 in the closed position as shown in solid line in FIG. 3. It is to be understood that the clamps 11 and 12 may be formed with two or more sections, so long as the pipe sections are clamped thereabout.

Each of the pipe clamps 11 and 12 also includes a pair of central support webs 32 connected as by welding to central segment 25, with each of the webs 32 having a bracket 33 mounted on each side thereof as shown.

Each of the hinged segments 26 has attached thereto a pair of support webs 35, the upper sides of which (as viewed in FIG. 3) are provided with brackets 36 which are similar to brackets 33 described above. It will be observed that support webs 32 and 35 are generally circumferentially spaced about pipe 14 and may sometimes generally be referred to as forming part of the arms of the pipe clamps.

Means are provided for opening hinged segments 26 to facilitate placement of the apparatus about sections of pipe. These means conveniently take the form of hydraulic cylinders 41 having piston rods 42 which are connected to support webs 32 adjacent hinge pins 27. Opposite sides of hydraulic cylinders 41 are each provided with pivot lugs 4 which are arranged to receive the ends of a pair of straps 43 and 44, with the opposite ends of straps 43 being connected to a bracket 33 by a hinge pin 45 and the opposite ends of straps 44 being connected to a bracket 36 by a hinge pin 46. Hydraulic cylinders 41 are arranged such that upon the extension stroke of piston rods 42, the apparatus is moved to the open or dotted line position as shown in FIG. 3. Upon movement of piston rods 42 to the retracted position, pipe clamp 12 is clamped about the pipe as shown by solid lines in FIG. 3.

It is to be understood that sometimes the apparatus may be described as having the clamps clamped about the pipe sections, but it is to be understood that the pipe clamps need not necessarily be fixedly clamped to the pipe sections since it is preferable that at least one of the pipe clamps 11 or 12 be arranged to slide axially for a small distance during the alignment operation as will be discussed hereinafter.

Each of the support webs 32 and 35 support and have connected thereto as by welding at the outer ends thereof power movement means conveniently in the form of a hydraulic cylinder assembly 50, the details of which are best shown in FIGS. 4 and 5. For purposes of convenience, the cylinder portion of the hydraulic cylinder assemblies 50 may sometimes be referred to as a part of the radially extending arms of the pipe clamps 11 and 12.

Referring now to FIG. 4, hinge segment 26 is shown attached to central segment 25 which is connected by support webs 32 to the hydraulic cylinder 51 of hydraulic cylinder assembly 50 as by welding or the like. Segments 25 and 26 may support on the inside thereof means for adjusting clamps 11 and 12 to different size pipes, which means may be in the form of bars 24, for example. As shown in FIGS. 5 and 6, cylinder 51 has mounted therein piston 52 which is arranged for reciprocation therein. The right end of cylinder 51 (as viewed in FIG. 5) is closed by cylinder plug 53 held in place by snap ring 54 and is provided with a central aperture 55 which is arranged to receive hydraulic line connector 56.

The left end of cylinder 51 (as viewed in FIGS. 4, 5 and 6) is closed by means of a pin end 58 which is welded or otherwise secured thereto. Pin end 58 is provided with a central bore therethrough for receiving therein piston rod 59 of hardened steel with a chromed surface, the right end of which is secured to piston 52 by conventional means and the left end of which is connected to a ball 60. The left end of the bore through pin end 58 is somewhat enlarged and is provided with rod bushing 61 of wear resistant material to increase operating life of the apparatus. Pin end 58 is also provided with a channel 62 communicating with the interior of cylinder 51, as shown, and is arranged to receive hydraulic connector 63 for the purpose of applying hydraulic fluid under pressure to piston 52.

Cylindrical beams 20 may be made of one or more sections to facilitate assembly and to provide means for lengthening or shortening the distance between pipe clamps 11 and 12 when desired. Further, each end of the beams 20, as best shown in FIGS. 5 and 6, is shown having a box-shaped socket end 64 threaded thereinto. Socket end 64 has an inwardly tapered bore which matches the surface of pin end 58, as shown.

The left end of socket end 64, as shown in FIGS. 5 and 6, is provided with a counterbore which is arranged to receive ring-shaped bushing 65 of wear resistant material, with the inner circumferential surface thereof being arranged to match the surface of ball 60. In addition, a ball cap 66 is mounted over the end of ball 60 and held in place by a plurality of bolts 67 which are threaded into socket end 64.

Hence, it will be observed that a ball and socket joint is provided by ball 60, bushing 65 and ball cap 66 which may sometimes be referred to as an articulated connection. When piston rod 59 is moved to the left as shown in FIGS. 5 and 6, by operation of piston 52, the internal tapered surface of socket end 64 is moved away from pin end 58 and the connection becomes fully universal, as best shown in FIG. 6. This full articulation permits the apparatus to be installed upon two sections of pipe which are initially substantially axially misaligned. Alternatively, when piston rod 59 is moved to the right by application of hydraulic pressure against piston 52 through hydraulic connector 63, ball 60 causes the tapered surface of socket end 64 to matingly engage the frusto-conical surface of pin end 58, whereby cylindrical beam 20 is held rigidly in a fixed relationship with the pipe clamp arms discussed above, of which supporting webs 32 and hydraulic cylinders 51 exemplify portions thereof. Further, the tapered end surface of socket end 64 and the frusto-conical surface of pin end 58 may sometimes be referred to as examples of the aforesaid abutment means, which facilitate the holding of beams 20 in the aforesaid rigid and predetermined relationship with the clamps. However, these abutment means may take different forms, as will be discussed hereinafter.

In operation, the apparatus is mounted upon two sections of pipe as shown and described with respect to FIG. 1. Each of the hydraulic cylinder assemblies 50 is in the extended position thereby permitting closing of pipe clamps 11 and 12 about pipe sections 13 and 14 as shown, and with pipe sections 13 and 14 substantially misaligned and with pipe coupling 15 in place, if such a coupling is to be used. Then by appropriate manipulation of operating valve 21, hydraulic fluid is applied to move the hydraulic cylinder assemblies 50 to the retracted position as shown and described with respect to FIG. 5, with socket end 64 abutting against pin end 58, thereby causing beams 20 to be perpendicularly aligned with the arms of the pipe clamps 11 and 12. Beams 20 are thus locked in a fixed position with clamps 11 and 12, in which position clamps 11 and 12 are axially aligned. Hence, pipe sections 13 and 14 are moved to axial alignment, as shown in FIG. 2.

At this point, hydraulic coupling 15 can be shifted laterally to the position shown in FIG. 2 and thereafter connected by conventional means. If a hydraulic coupling 15 is not to be used, but pipe sections 13 and 14 are to be joined by other means as for example by welding, then the welding operation can then be performed with pipe sections 13 and 14 held in the axially aligned and spaced apart position.

When the coupling operation has been completed, then the apparatus is disengaged from the connected pipe by operation of hydraulic cylinder 41 as described above with respect to FIG. 3, whereby hinged segments 26 of the pipe clamps 11 and 12 are caused to move radially outward thereby disengaging the pipe. Thereafter the apparatus can be removed from location and prepared for another operation.

It is to be understood that central segments 25 and hinged segments 26 of pipe clamps 11 and 12 can be provided with inserts, such as bars 24, to accommodate pipe of different sizes. Further, the segments 25 and 26 of one of the pipe clamps 11 and 12 could conveniently be provided with rollers arranged for rolling longitudinally along one of the sections of pipe, since one of the pipe clamps 11 or 12 must shift axially along one of the pipe sections during the alignment operation because of the operation of hydraulic cylinder assemblies 50. Such rollers or other non-scarring contacting means would protect the pipe at the point of this movement therealong.

Referring now to FIG. 7, an alternate embodiment of the invention is shown in schematic form. In this embodiment, there is provided a pair of spaced apart clamps 71 and 72 which are generally similar to clamps 11 and 12 discussed with respect to the previous embodiment and are arranged for clamping about misaligned sections of pipe 73 and 74, which pipes are similar to pipes 13 and 14 in the previous embodiment. In addition, each of the clamps 71 and 72 has a plurality of hydraulic cylinder assemblies 80 spaced circumferentially thereabout which are similar to hydraulic cylinder assemblies 50 previously discussed, but modified to this extent. Each of the pistons of the hydraulic cylinder assemblies 80 is connected to a flexible articulated connection member in the form of a steel cable 81, each of which passes through an axial bore provided in connecting members 82.

Each end of each of the connecting members 82 is provided with a cone-shaped recess generally in the shape of the internal surface of socket end 64 shown in FIG. 6 embodiment, which recesses are arranged for mating engagement with the cone-shaped end surfaces 83 of the hydraulic cylinder assemblies 80.

In operation, clamps 71 and 72 would be installed upon pipe sections 73 and 74 in the same manner that clamps 11 and 12 were installed upon pipe sections 13 and 14 of the previous embodiment. The hydraulic pistons in the hydraulic cylinder assemblies 80 would then be retracted, thereby drawing the ends of connecting members 82 into a predetermined and fixed abutting relationship with cone surfaces 83 of hydraulic cylinder assemblies 80, in which position, pipe clamps 71 and 72 are axially aligned. During such alignment, the ends of pipe sections 73 and 74 are similarly axially aligned. The pipe sections 73 and 74 can then be joined by the use of a hydraulic couple, by welding or otherwise, as discussed above with respect to the previous embodiment. It will be observed that the embodiment shown in FIG. 7 has the articulated connection means between clamps 71 and 72 and connecting members 82, thereby accommodating substantially initial misalignment of pipe sections 73 and 74. Further, it has similar abutment means whereby the pipe clamps 71 and 72 are moved to axial alignment when the abutment means are engaged, the same as with the previous embodiment.

Referring now to FIG. 8, a still further embodiment will be described. In this embodiment, there are a pair of clamps 91 and 92 which are arranged for clamping about pipe sections 93 and 94 in the manner similar to the two clamps 71 and 72, discussed above. In this embodiment, each of the pipe clamps 91 and 92 supports a pair of hydraulic cylinder assemblies 95, the operating axis of which deviate somewhat from or are angularly with the axis of the clamp with which each is associated. In addition, each of the hydraulic cylinder assemblies 95 is provided with a hydraulic piston (not shown) which is connected to a piston rod 96 which is shown in the extended position of FIG. 8. The ends of rods 96 are each connected by a ball joint connection to the ends of arcuate shaped connecting members 97.

In the embodiment shown in FIG. 8, the abutment means takes a somewhat different configuration. For example, the ends of hydraulic cylinders 95 are formed with pyramid-shaped ends 98 and the ends of connecting members 97 are box-shaped generally, which shape is in the form of mating pyramid recesses, which are arranged to mate with the ends 98.

In operation of this embodiment, clamps 91 and 92 are installed upon pipe sections 93 and 94 in a manner similar to the installation of clamps 71 and 72 and 11 and 12 of the prior embodiments. Thereafter, piston rods 96 are retracted by operation of hydraulic cylinder assemblies 95, thereby drawing the recessed ends of connecting members 97 into abutment with pyramid-shaped ends 98 of hydraulic cylinder assemblies 95. The apparatus is arranged such that in this abutting position, pipe clamps 91 and 92 become axially aligned and hence pipe sections 93 and 94 are moved to an axially aligned position. In this embodiment, only two connecting members 97 are required to accomplish the alignment of pipe in all planes as a result of the cooperation operation of the abutment means in the form of pyramid-shaped ends 98 and the matching ends of connecting members 97, which particular abutment means prevents any tendency for clamps 91 and 92 to rotate relative to each other.

Further modifications may be made within the scope of this invention. Accordingly, the foregoing description is to be construed as illustrative only and further modifications will be obvious to those skilled in the art in view of this description.

What I claim is:

1. In apparatus for axially aligning two sections of pipe, the combination comprising:

a pair of generally axially spaced apart clamps, each of said clamps being arranged for clamping about a length of one of said sections of pipe;

at least one rigid member supported between said clamps;

abutment means interposed between at least one of said clamps and said member for holding said member and said clamp in a predetermined and fixed relationship with each other when abutting and in which relationship the central axes of said clamps are axially aligned;

and means associated said one clamp for moving said member into said fixed position, to thereby axially align said clamps and said sections of pipe held thereby.

2. In apparatus for axially aligning two sections of pipe, the combination comprising:
   a pair of spaced apart clamps, each of which is arranged for clamping about a length of one of said sections of pipe;
   a plurality of rigid members supported between said clamps;
   abutment means interposed between at least one end of each of said members and the adjacent clamp for holding said members and said clamps in predetermined and fixed relationships when abutting and in which relationships the central axes of said clamps are axially aligned;
   and means associated with at least one of said clamps for moving said members into said fixed relationships, to thereby axially align said clamps and said sections of pipe held thereby.

3. In apparatus for axially aligning two sections of pipe, the combination comprising:
   a pair of generally axially spaced apart clamps, each of said clamps being arranged for clamping about a length of one of said sections of pipe;
   a plurality of rigid members supported between said clamps and circumferentially spaced around said sections of pipe;
   abutment means interposed between at least one end of each of said members and the clamp adjacent thereto for supporting said members and said clamps in predetermined and fixed relationships when abutting and in which relationships the central axes of said clamps are axially aligned;
   and means operably connected with said clamps for moving said members into said fixed relationships, to thereby axially align said clamps and said sections of pipe held thereby.

4. In apparatus for axially aligning two sections of pipe, the combination comprising:
   a pair of generally axially spaced apart clamps, each of which is arranged for clamping about a length of one of said sections of pipe;
   a plurality of rigid members supported between said clamps;
   articulated connection means for operably interconnecting said clamps while the axes of said clamps are misaligned;
   abutment means between at least one end of each of said members and the clamp adjacent thereto for supporting said members and said clamp in predetermined and fixed relationships when abutting and in which relationships the central axes of said clamps are axially aligned;
   and means operably connected with said clamps for moving said clamps and said members into said fixed relationships, to thereby axially align said clamps and said sections of pipe held thereby.

5. In apparatus for axially aligning two sections of pipe, the combination comprising:
   a pair of axially spaced apart clamps, each of which is arranged for clamping about one of said sections of pipe, and each of which has a plurality of circumferentially spaced apart arms extending generally radially outward from the axis of the associated pipe sections;
   a plurality of connecting members mounted between said clamps in circumferentially spaced apart positions around said sections of pipe;
   articulated connecting means for operatively connecting at least one end of each of said connecting members to one of said arms of one of said clamps;
   abutment means between the articulated connecting end of each of said members and the adjacent clamp for supporting said members and said clamps in predetermined and non-movable relationship when abutting and in which relationships the central axes of said clamps are axially aligned;
   and means for moving each of said connecting members into said abutting relationships, to thereby axially align said clamps and said sections of pipe held thereby.

6. The invention as claimed in claim 1 including:
   a plurality of said rigid members supported between said clamps and circumferentially spaced around said pipe sections;
   means operably connected with both of said clamps for moving said members into said abutting relationship.

7. The invention as claimed in claim 1 including: at least three of said rigid members supported between said clamps.

8. The invention as claimed in claim 4 wherein: said connection means includes a universal connection between at least one end of each of said members and the clamp adjacent thereto.

9. The invention as claimed in claim 8 wherein: said universal connection is in the form of a ball and socket joint.

10. The invention as claimed in claim 4 wherein: said articulated connection means includes a flexible cable associated with each of said members, with each end of each of said cables being operably connected to one of said clamps.

11. The invention as claimed in claim 4 wherein: said means for moving said clamps to said abutting relationship includes a hydraulic cylinder assembly.

12. The invention as claimed in claim 10 wherein: said means for moving said clamps and said members into abutting relationships includes power means for taking up slack on at least one end of each of said cables.

13. The invention as claimed in claim 12 wherein:
   each of said members has an axial bore therethrough;
   and each of said cables passes through a bore of one of said members.

14. In apparatus for axially aligning two actions of pipe, the combination comprising:
   a pair of axially spaced apart clamps, each of which is arranged for clamping about a substantial length of one of said sections of pipe, with each of said clamps having at least three circumferentially spaced apart arms extending radially outward at generally right angles to the axis of the associated pipe section;
   at least three connecting members mounted between said clamps in circumferentially spaced apart positions around said sections of pipe, with a portion of the end of each of said connecting members being provided with an engaging surface which is arranged to engage a portion of the associated arm in an abutting relationship, with the long axis of said connecting member being held in perpendicular alignment with the associated arm when in said abutting relationship;
   articulated connecting means for operatively connecting each end of each of said connecting members to one arm of one of said clamps;
   and power means associated with each of said ends of said connecting members and the associated arm for moving said ends and said arms to said abutting relationship, whereby said connecting members are moved to and held in said perpendicular alignment and said sections of pipe are thereby axially aligned.

15. The invention as claimed in claim 14 wherein: each of said power means includes a hydraulic cylinder assembly, one end of which is connected to one of said arms and the other end of which is connected to said connecting member.

16. The invention as claimed in claim 15 wherein:
   said connecting means includes a ball and socket joint between each end of said connecting member and the associated arm;
   and wherein said ball of said joint is connected to the piston of said hydraulic cylinder assembly.

17. The invention as claimed in claim 16 wherein: said engaging surface of each of said end portions of each of said connecting members and the abutting portions of said associated arms are in the form of mating box and pin ends.

References Cited

UNITED STATES PATENTS 1,627,288   5/1927   Kurkowski _____ 269—37
2,344,939   3/1944   Bennett _____ 29—200
3,284,883   11/1966  Haverfield _____ 29—200

DONALD R. SCHRAN, Primary Examiner

U.S. Cl. X.R.

228—49; 269—37